(12) United States Patent
Kim (10) Patent No.: US 10,338,338 B2
(45) Date of Patent: Jul. 2, 2019

(54) LENS MODULE

(71) Applicant: Samsung Electro-Mechanics Co., Ltd., Suwon (KR)

(72) Inventor: Duck Hun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 13 days.

(21) Appl. No.: 15/632,444

(22) Filed: Jun. 26, 2017

(65) Prior Publication Data

US 2017/0293104 A1 Oct. 12, 2017

Related U.S. Application Data

(63) Continuation of application No. 13/835,414, filed on Mar. 15, 2013, now abandoned.

(30) Foreign Application Priority Data

Dec. 21, 2012 (KR) .................... 10-2012-0151021

(51) Int. Cl.
| | |
|---|---|
| *G02B 9/04* | (2006.01) |
| *G02B 7/02* | (2006.01) |
| *G02B 13/00* | (2006.01) |
| *G02B 5/00* | (2006.01) |
| *G02B 27/00* | (2006.01) |

(52) U.S. Cl.
CPC ............. *G02B 7/021* (2013.01); *G02B 5/005* (2013.01); *G02B 7/023* (2013.01); *G02B 7/026* (2013.01); *G02B 13/001* (2013.01); *G02B 27/0018* (2013.01); *G02B 7/028* (2013.01)

(58) Field of Classification Search
CPC .... H04N 5/2254; G02B 27/0025; G02B 7/02; G02B 7/021; G02B 13/001; G02B 7/023; G02B 27/0018; G02B 3/062; G02B 3/0075; G02B 5/005; G02B 9/02; G03B 9/02

See application file for complete search history.

(56) References Cited

U.S. PATENT DOCUMENTS

| | | | |
|---|---|---|---|
| 7,715,126 | B2 | 5/2010 | Apel et al. |
| 7,755,858 | B2 | 7/2010 | Chen |

(Continued)

FOREIGN PATENT DOCUMENTS

| | | |
|---|---|---|
| CN | 101620307 A | 1/2010 |
| CN | 101634738 A | 1/2010 |

(Continued)

OTHER PUBLICATIONS

Chinese Office Action issued in counterpart Chinese Patent Application No. 201310072442.2 dated Aug. 28, 2015. (18 pages in English and 10 pages in Chinese).

(Continued)

*Primary Examiner* — Alicia M Harrington
(74) *Attorney, Agent, or Firm* — NSIP Law (57) ABSTRACT

A lens module includes a first lens, a second lens, and a distance maintenance member disposed between the first lens and the second lens, the distance maintenance member having a hole for adjusting an amount of light. An inner circumferential surface of the hole includes a plurality of inclined surfaces that are respectively inclined at predetermined angles with respect to an optical axis.

14 Claims, 5 Drawing Sheets

(56) References Cited

U.S. PATENT DOCUMENTS

| | | | | |
|---|---|---|---|---|
| 9,042,040 | B2* | 5/2015 | Kim | .................. G02B 3/08 359/741 |
| 2004/0076423 | A1 | 4/2004 | Inoue et al. | |
| 2006/0061884 | A1 | 3/2006 | Chuman | |
| 2012/0162795 | A1 | 6/2012 | Yoshimura | |
| 2012/0314288 | A1 | 12/2012 | Lai | |
| 2013/0021681 | A1* | 1/2013 | Ho | .................. G02B 7/021 359/740 |
| 2013/0076971 | A1 | 3/2013 | Nishimoto et al. | |

FOREIGN PATENT DOCUMENTS

| | | |
|---|---|---|
| CN | 101666899 A | 3/2010 |
| JP | 63-253317 A | 10/1988 |
| JP | 6-300950 A | 10/1994 |
| JP | 7-20368 A | 1/1995 |
| JP | 9-281374 A | 10/1997 |
| JP | 2003-270711 A | 9/2003 |
| JP | 2004-138865 A | 5/2004 |
| JP | 2004-317990 A | 11/2004 |
| JP | 2005-25074 A | 1/2005 |
| JP | 2005-84470 A | 3/2005 |
| JP | 2006-85013 A | 3/2006 |
| JP | 2007-57795 A | 3/2007 |
| JP | 2007-163656 A | 6/2007 |
| JP | 2009-139693 A | 6/2009 |
| JP | 2011-8125 A | 1/2011 |
| JP | 2011-75682 A | 4/2011 |
| JP | 2011-101385 A | 5/2011 |
| JP | 2011-221300 A | 11/2011 |
| JP | 2012-2979 A | 1/2012 |
| JP | 2012-88585 A | 5/2012 |
| JP | 2012-163875 A | 8/2012 |
| KR | 10-2006-0081971 A | 7/2006 |
| KR | 10-1172248 B1 | 8/2012 |
| WO | WO 2006/080184 A1 | 8/2006 |

OTHER PUBLICATIONS

Japanese Office Action dated Dec. 10, 2013 in corresponding Japanese Application No 2013-030078. (7 pages in English and 3 pages in Japanese).

Japanese Office Action dated Apr. 8, 2014 in corresponding Japanese Patent Application No. 2013-030078. (5 pages in English and 2 pages in Japanese).

Japanese Office Action dated Dec. 2, 2014 in corresponding Japanese Patent Application No. 2014-045478. (6 pages in English and 3 pages in Japanese).

Japanese Office Action dated Jun. 9, 2015 in counterpart Japanese Patent Application No. 2014-045478 (6 pages, with English Translation).

Japanese Office Action dated Mar. 1, 2016 in counterpart Japanese Patent Application No. 2014-045478 (6 pages, with English Translation).

Korean Office Action dated Dec. 24, 2013 in counterpart Korean Patent Application No. 10-2012-0151021. (6 pages in English and 5 pages in Korean).

Korean Office Action dated Jun. 26, 2014 in counterpart Korean Patent Application No. 10-2012-0151021. (3 pages in English and 4 pages in Korean).

* cited by examiner

LENS MODULE

CROSS-REFERENCE TO RELATED APPLICATIONS

This application is a Continuation application of U.S. application Ser. No. 13/835,414, filed Mar. 15, 2013, which claims the benefit under 35 USC 119(a) of Korean Patent Application Korean Patent Application No. 10-2012-0151021 respectively filed on Dec. 21, 2012 in the Korean Intellectual Property Office, the entire disclosures of which are all incorporated herein by reference for all purposes.

BACKGROUND OF THE INVENTION

Field of the Invention

The present invention relates to a lens module, and more particularly, to a lens module in which internal reflections such as ghost and flare phenomena are minimized.

Description of the Related Art

As levels of performance of portable devices (e.g., portable telephones) are improved, high resolution is required in small cameras installed in portable devices. Thus, small cameras installed in portable devices may require lens modules having increased numbers of lenses.

A lens module including the plurality of lenses may include lenses and a lens barrel that accommodates the lenses. The lens module has a structure in which the lenses are sequentially inserted into the lens barrel to have aligned optical axes.

However, since a lens module may have a structure in which the optical axes of the lenses are aligned by the lens barrel, the lenses installed in the lens barrel should have the same diameter or be manufactured to have common machining errors.

Furthermore, a lens module including a plurality of lenses may cause a flare phenomenon due to internal reflection. As a result, a lens module may be deteriorated in terms of resolution.

Thus, development of lens modules which are capable of accurately aligning lenses with each other and also reducing a flare phenomenon is required.

There are provided Patent Documents 1 and 2 as prior art references in relation to the present invention. Patent Document 1 discloses a lens barrel structure in which deviation of focal lengths between lenses. Patent Document 2 discloses a lens structure capable of minimizing a size of a lens barrel.

However, Patent Documents 1 and 2 do not disclose any structure for minimizing ghost and flare phenomena due to internal reflection.

CONVENTIONAL ART DOCUMENTS

Patent Documents (Patent Document 1) KR2006-081971 A
(Patent Document 2) JP2011-075682 A

SUMMARY OF THE INVENTION

An aspect of the present invention provides a lens module capable of easily aligning lenses and minimizing an occurrence of a flare phenomenon.

According to an aspect of the present invention, there is provided a lens module including: a first lens; a second lens; and a distance maintenance member disposed between the first lens and the second lens, the distance maintenance member having a hole for adjusting an amount of light, wherein an inner circumferential surface of the hole includes a plurality of inclined surfaces that are respectively inclined at predetermined angles with respect to an optical axis.

The plurality of inclined surfaces may be discontinuously disposed with regard to one another.

The plurality of inclined surfaces may include: a first inclined surface having a first inclined angle; and a second inclined surface having a second inclined angle.

The first and second inclined angles may be different from each other.

The lens module may further include a lens barrel that accommodates the first lens and the second lens.

The lens barrel may be formed of a material having the same linear expansion coefficient as those of the first and second lenses.

Each of the first and second lenses may be formed of a plastic material, and the lens barrel may be formed of polyarylate (PAR).

The distance maintenance member may be formed of a nonferrous metal.

According to another aspect of the present invention, there is provided a lens module including: a first lens; a second lens; and a first distance maintenance member disposed between the first lens and the second lens, the first distance maintenance member having a first hole for adjusting an amount of light; and a second distance maintenance member disposed between the first lens and the second lens, the second distance maintenance member having a second hole for adjusting an amount of light, wherein an inner circumferential surface of the first hole includes a first inclined surface having a first inclined angle with respect to an optical axis, and an inner circumferential surface of the second hole includes a second inclined surface having a second inclined angle with respect to the optical axis.

The first and second inclined angles may be different from each other.

The first and second holes may be different in size.

The lens module may further include a lens barrel that accommodates the first lens and the second lens.

The lens barrel may be formed of a material having the same linear expansion coefficient as those of the first and second lenses.

Each of the first and second lenses may be formed of a plastic material, and the lens barrel may be formed of polyarylate (PAR).

Each of the first and second distance maintenance members may be formed of a nonferrous metal.

According to another aspect of the present invention, there is provided a lens module including: a lens barrel; a first lens group coupled to the lens barrel; a second lens group coupled to the first lens group without in contact with the lens barrel; and a third lens group coupled to the second lens group.

The third lens group may be in contact with the lens barrel.

An inclined surface may be disposed on an outer circumferential surface of the third lens group.

The second lens group may include a plurality of lenses.

The lens module may further include a distance maintenance member disposed between the second lens group and the third lens group and having a hole for adjusting an amount of light.

The distance maintenance member may be formed of a nonferrous metal.

An inner circumferential surface of the hole may include a plurality of inclined surfaces, each having a predetermined angle with respect to an optical axis.

The plurality of inclined surfaces may include: a first inclined surface having a first inclined angle; and a second inclined surface having a second inclined angle.

The first and second inclined angles may be different from each other.

The lens barrel may be formed of a material having the same linear expansion coefficient as those of the first to third lens groups.

Each of the first to third lenses may be formed of a plastic material, and the lens barrel may be formed of polyarylate (PAR).

The lens module may further include: a first distance maintenance member disposed between the second lens group and the third lens group, the first distance maintenance member having a first hole for adjusting an amount of light; and a second distance maintenance member disposed between the second lens group and the third lens group, the second distance maintenance member having a second hole for adjusting the amount of light.

Each of the first and second distance maintenance members may be formed of a nonferrous metal.

An inner circumferential surface of the first hole may include a first inclined surface having a first inclined angle with respect to an optical axis, and an inner circumferential surface of the second hole may include a second inclined surface having a second inclined angle with respect to the optical axis.

The first and second inclined angles may be different from each other.

The first and second holes may be different in size.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

In following descriptions of the present invention, the terms to describe the present invention are defined in consideration of features of the present invention, and therefore should not be construed that the scope of the invention is limited thereto.

Figure 1:
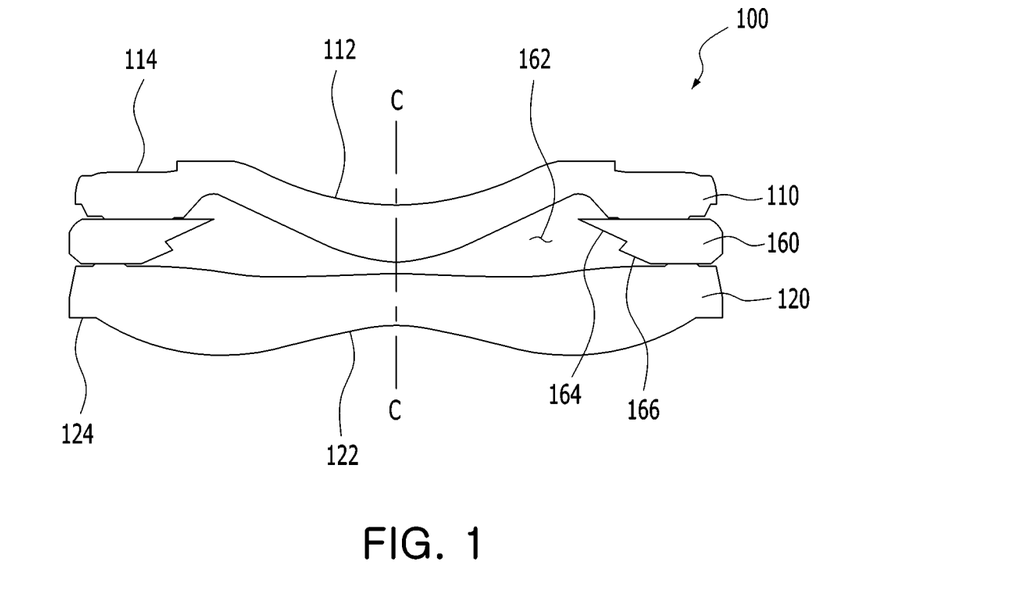
FIG. 1 is a view of a lens module according to a first embodiment of the present invention.
Figure 2:
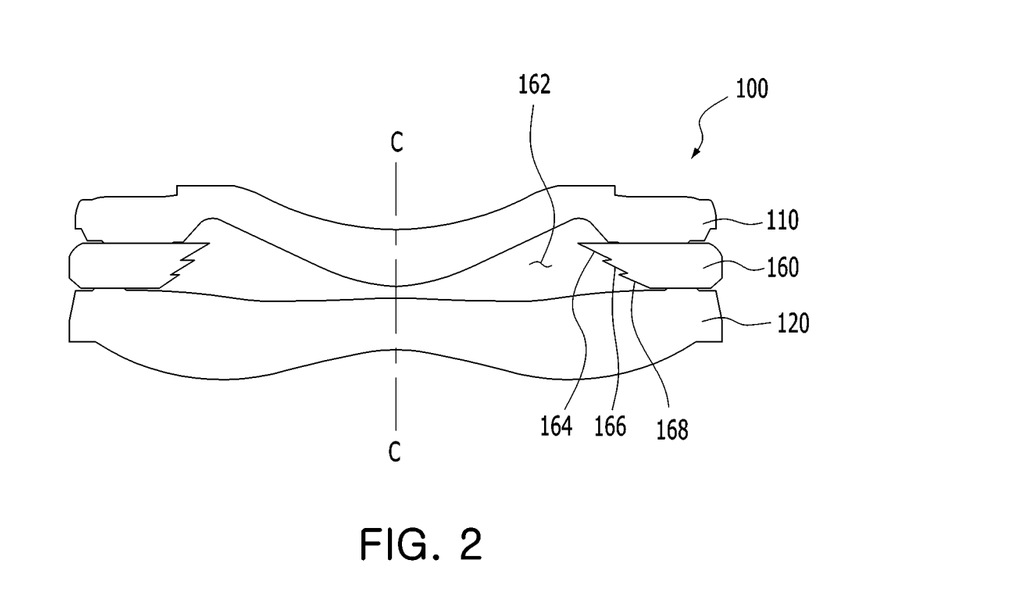
FIG. 2 is a view illustrating an embodiment of the lens module of FIG. 1.
Figure 3:
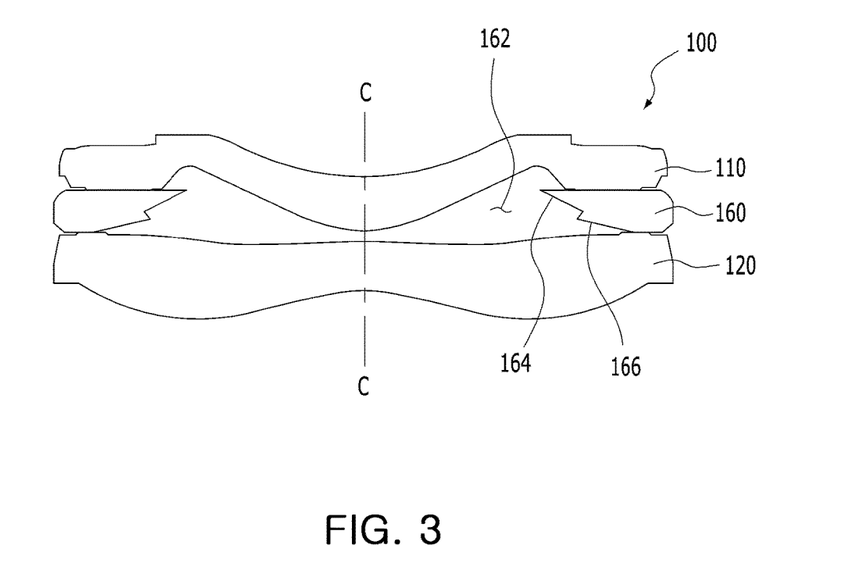
FIG. 3 is a view illustrating a further embodiment of the lens module of FIG. 1.
Figure 4:
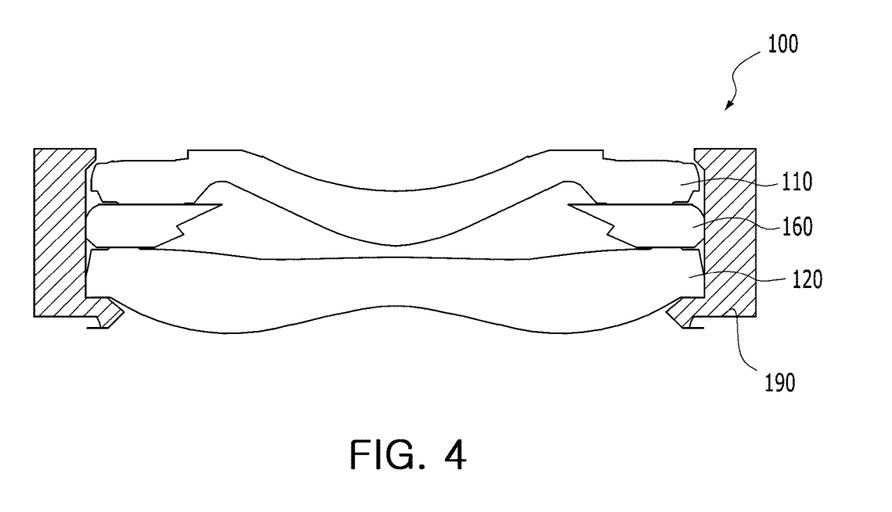
FIG. 4 is a view illustrating a further embodiment of the lens module of FIG. 1.
Figure 5:
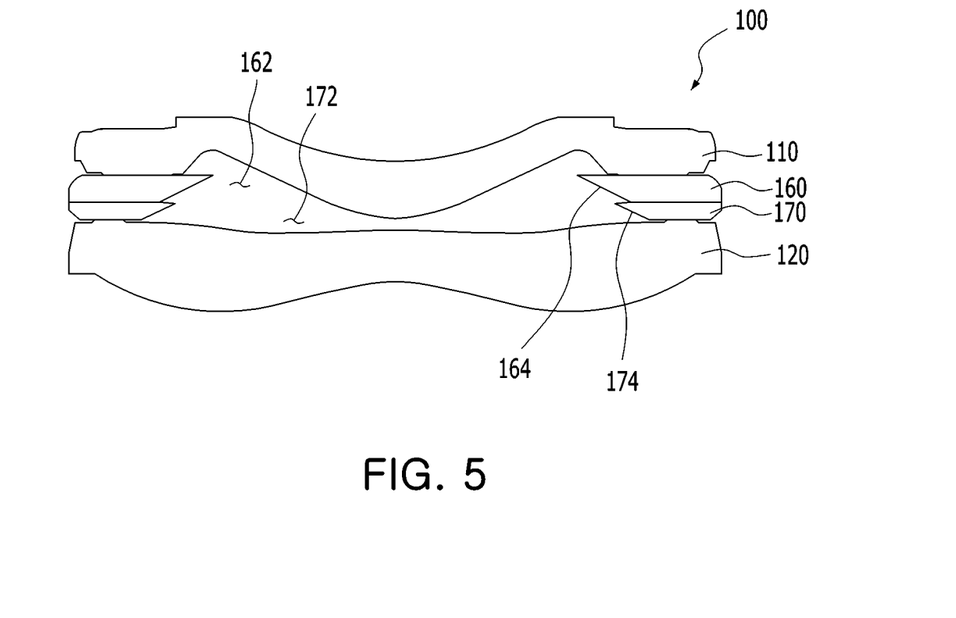
FIG. 5 is a view of a lens module according to a second embodiment of the present invention.
Figure 6:
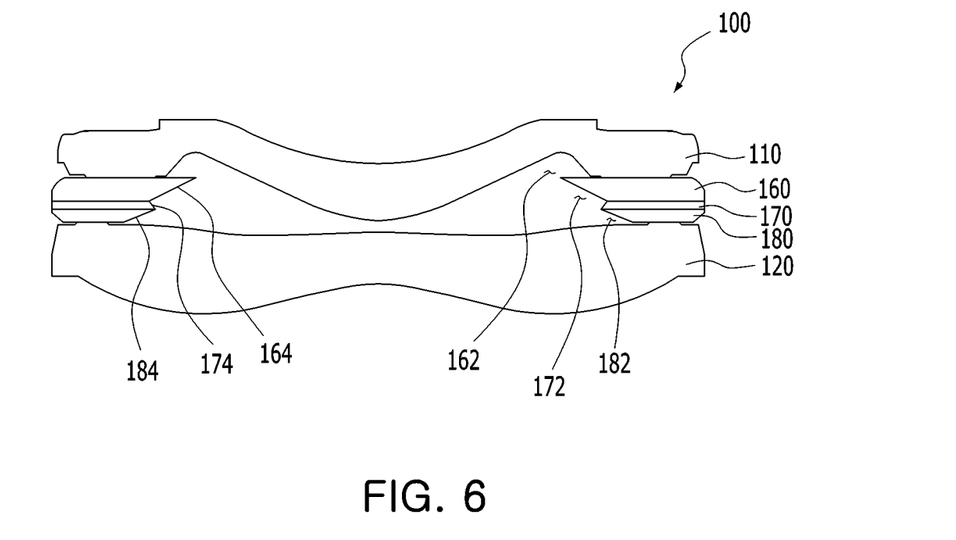
FIG. 6 is a view illustrating an embodiment of the lens module of FIG. 5.
Figure 7:
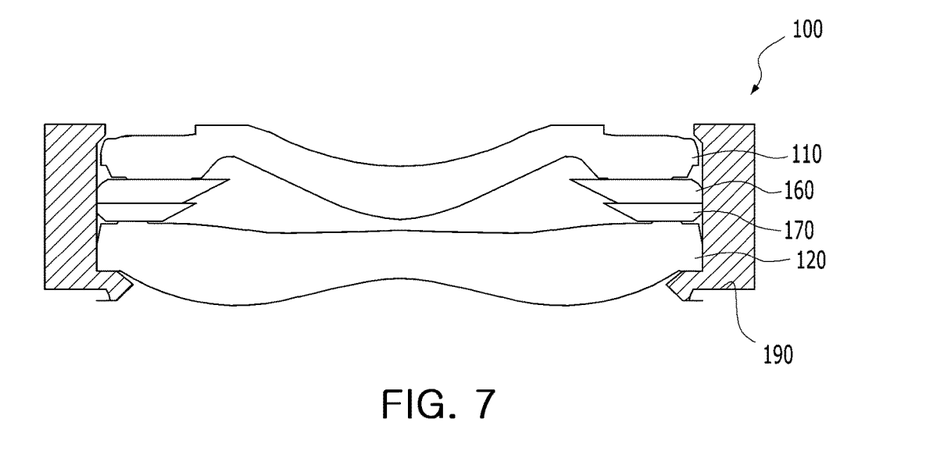
FIG. 7 is a view illustrating a further embodiment of the lens module of FIG. 5.
Figure 8:
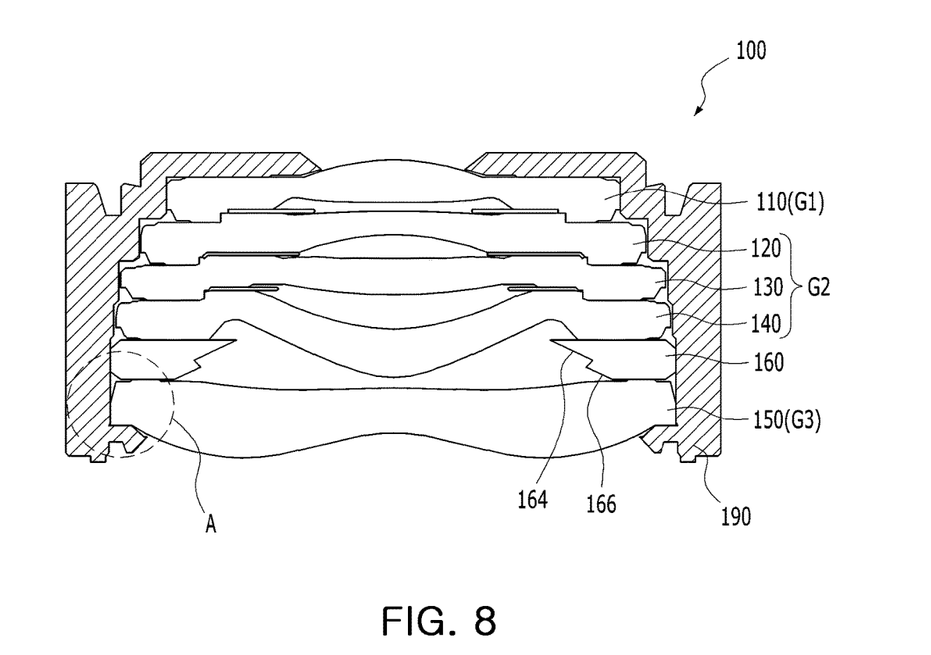
FIG. 8 is a view of a lens module according to a third embodiment of the present invention.
Figure 9:
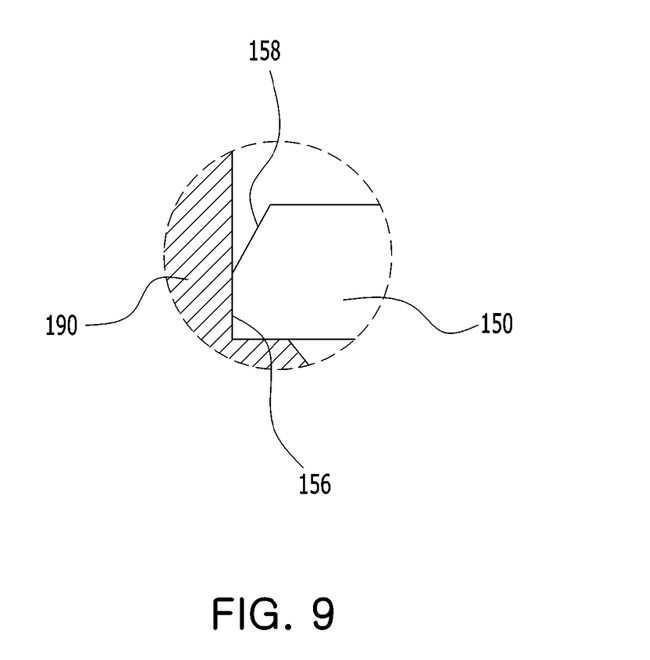
FIG. 9 is an enlarged view of portion A of FIG. 8.

FIG. 1 is a view of a lens module according to a first embodiment of the present invention, FIG. 2 is a view illustrating an embodiment of the lens module of FIG. 1, FIG. 3 is a view illustrating a further embodiment of the lens module of FIG. 1, FIG. 4 is a view illustrating a further embodiment of the lens module of FIG. 1, FIG. 5 is a view of a lens module according to a second embodiment of the present invention, FIG. 6 is a view illustrating an embodiment of the lens module of FIG. 5, FIG. 7 is a view illustrating a further embodiment of the lens module of FIG. 5, FIG. 8 is a view of a lens module according to a third embodiment of the present invention, and FIG. 9 is an enlarged view of portion A of FIG. 8.

Hereinafter, a lens module according to a first embodiment of the present invention will be described with reference to FIGS. 1 to 4.

A lens module 100 according to the first embodiment may include a first lens 110, a second lens 120, and a distance maintenance member 160. In addition, the lens module 100 may selectively further include a light shielding member (not shown). Also, the lens module 100 may further include a plurality of lenses according to a resolution desired to be realized.

The first lens 110 may be manufactured by using glass, a glass mold, a thermosetting resin, a thermoplastic resin, or a plastic material. The first lens 110 may generally have a positive refractive index or a negative refractive index. The first lens 110 may be a lens disposed closer to a subject than the second lens 120 in the lens module 100.

The first lens 110 may include a functional lens part 112 and a flange part 114. The functional lens part 112 may refract incident light reflected from the subject. For this, the functional lens part 112 may have a concave or convex shape or a meniscus shape. For reference, in the current embodiment, the functional lens part 112 of the first lens 110 may have a meniscus shape, convex toward the second lens 120. The flange part 114 may be disposed on an edge of the functional lens part 112. The flange part 114 may be a portion in contact with another lens (i.e., the second lens 120). Here, the flange part 114 may be coated with a light shielding material, or a light shielding film may be attached to the flange part 114. In this case, unnecessary light incident to the second lens 120 may be blocked by the flange part 114.

The second lens 120 may be manufactured by using glass, a glass mold, a thermosetting resin, a thermoplastic resin, or a plastic material. The second lens 120 may generally have a positive refractive index or a negative refractive index. The second lens 120 may be a lens disposed closer to an image sensor than the first lens 120 in the lens module 100.

The second lens 120 may include a functional lens part 122 and a flange part 124. The functional lens part 122 may refract incident light reflected from the subject. For this, the functional lens part 122 may have a concave or convex shape or a meniscus shape. For reference, in the current embodiment, the functional lens part 122 of the second lens 120 may have a shape that has an inflection point at a point except for a portion (i.e., a center of the lens) crossing an optical axis C-C. The flange part 124 may be disposed on an edge of the functional lens part 122. The flange part 124 may be a portion in contact with another lens (i.e., the first lens 110). Here, the flange part 124 may be coated with a light shielding material, or a light shielding film may be attached to the flange part 124. In this case, incidence of unnecessary light into the image sensor may be blocked by the flange part 124.

A distance maintenance member 160 may be disposed between the first lens 110 and the second lens 120. The distance maintenance member 160 may adjust an amount of light incident travelling from the first lens 110 to the second lens 120. Also, the distance maintenance member may prevent unnecessary light incident from the first lens 110 from being incident to the second lens 120. For this, the distance maintenance member 160 may have a hole 162 through which the optical axis C-C passes.

Furthermore, the distance maintenance member 160 may reduce ghost and flare phenomena due to internal reflection of the lens. For this, a plurality of inclined surfaces 164 and 166 may be disposed on an inner circumferential surface of the hole 162 as shown in FIG. 1.

The inclined surfaces 164 and 166 may include a first inclined surface 164 and a second inclined surface 166. Here, the first inclined surface 164 and the second inclined surface 166 may be discontinuously disposed with regard to one another. As shown in FIG. 2, at least three inclined surfaces 164, 166, and 168 may be provided. In this case, the inclined surfaces 164, 166, and 168 may improve the blocking effect of the ghost and flare phenomena. Furthermore, the first and second inclined surfaces 164 and 166 may have the same inclined angle with respect to the optical axis C-C as shown in FIG. 1. Alternatively, the first and second inclined surfaces 164 and 166 may have different inclined angles with respect to the optical axis C-C as shown in FIG. 3. Here, the former may enable the distance maintenance member 160 to be easily manufactured, and the latter may effectively block occurrence of the ghost and flare phenomena by using the distance maintenance member 160.

The distance maintenance member 160 may be formed of a nonferrous metal. For example, the distance maintenance member 160 may be formed of a copper or aluminum material. In this case, the distance maintenance member 160 may be easily formed, and also manufacturing costs of the distance maintenance member 160 may be reduced. For reference, the distance maintenance member 160 may have a surface coated with a light shielding material.

The lens module 100 may further include a lens barrel 190. The lens barrel 190 may be manufactured to have a cylindrical shape to accommodate the first and second lenses 110 and 120. The lens barrel 190 may be coupled to only one lens of the first and second lenses 110 and 120. For example, the lens barrel 190 may be coupled to only one lens having a relatively large diameter of two lenses. For reference, in the current embodiment, the lens barrel 190 and the second lens 120 are coupled through mutual contact therebetween.

This coupling structure may be advantageous for mounting a plurality of lenses on the lens barrel 190. That is, since only one lens of the plurality of lenses mounted on the lens barrel 190 is coupled to the lens barrel 190, a press-fitting process for separately press-fitting the plurality of lenses into the lens barrel 190 may be omitted. Furthermore, since only a few lenses are in contact with the lens barrel 190, deformation of the lenses or the lens barrel 190 occurring in the case that the plurality of lenses are forcibly press-fitted into the lens barrel 190 may be minimized.

The lens barrel 190 and the lenses 110 and 120 may be formed of materials having the same linear expansion coefficient. For example, the lens barrel 190 may be formed of a polyarylate (PAR) material. Here, since the PAR has substantially the same linear expansion coefficient as the lenses 110 and 120 formed of plastic, the PAR may effectively buffer the contraction and expansion of the lens due to a temperature change in the surrounding environment.

As described above, the lens module may reduce the occurrence of the ghost and flare phenomena due to the internal reflection of the lens through the distance maintenance member 160 having the plurality of inclined surfaces.

In addition, since the lenses 110 and the 120 and the lens barrel 190 of the lens module 100 are formed of the materials having the same linear expansion coefficient, a phenomenon in which an alignment position between the lenses is twisted while the lenses are expanded or contracted at a high or a low temperature may be minimized.

Hereinafter, a lens module according to another embodiment of the present invention will be described. In the following description of another embodiment, the same components as the first embodiment are indicated by the same reference numerals as the first embodiment, and thus detailed descriptions with respect to the components will be omitted.

A lens module according to a second embodiment will be described with reference to FIGS. 5 to 7.

A lens module 100 according to the current embodiment may be distinguishable from the lens module 100 according to the first embodiment in terms of configurations of distance maintenance members 160 and 170. For reference, the lens module 100 according to the current embodiment may be distinguished from the lens module 100 according to the first embodiment in that the plurality of distance maintenance members 160 and 170 are provided.

In the current embodiment, the distance maintenance members 160 and 170 may be provided in plural. That is, as shown in FIG. 5, the distance maintenance members 160 and 170 may include first and second distance maintenance members 160 and 170. A first hole 162 may be formed in the first distance maintenance member 160, and a second hole 172 may be formed in the second distance maintenance member 170. Here, the first and second holes 162 and 172 may have the same size or different sizes. Here, the former may allow the distance maintenance members 160 and 170 to be easily manufactured, and the latter may effectively prevent the ghost and flare phenomena from occurring by using the distance maintenance members 160 and 170. For reference, each of the first and second holes 162 and 172 may have a cross-sectional area gradually increasing from a first lens 110 toward a second lens 120.

A first inclined surface 164 may be disposed on an inner circumferential surface of the first hole 162. The first inclined surface 164 may be inclined at a predetermined angle with respect to an optical axis C-C. Here, the inclined angle of the first inclined surface 164 may be changed according to a size of the lens and a disposition of the first distance maintenance member 160.

Similarly, a second inclined surface 174 may be disposed on an inner circumferential surface of the second hole 172. The second inclined surface 174 may be inclined at a predetermined angle with respect to the optical axis C-C. Here, the inclined angle of the second inclined surface 174 may be changed according to a size of the lens and a disposed position of the second distance maintenance member 170. Also, the second inclined surface 174 may have the same inclined angle as that of the first inclined surface 164 or have an inclined angle different from that of the first inclined surface 164.

As shown in FIG. 7, the lens module 100 according to the current embodiment may further include a lens barrel 190 as occasion demands.

In an embodiment of the current embodiment, as shown in FIG. 6, the distance maintenance members may include three distance maintenance members 160, 170, and 180. In detail, the distance maintenance members may include a first distance maintenance member 160, a second distance maintenance member 170, and a third distance maintenance member 180.

A first hole 162 having a first size may be formed in the first distance maintenance member 160. Also, the first inclined surface 164 may be disposed on an inner circumferential surface of the first hole 162. A second hole 172 having a second size may be formed in the second distance maintenance member 170. Also, the second inclined surface 174 may be disposed on an inner circumferential surface of the second hole 172. Similarly, a third hole 182 having a third size may be formed in the third distance maintenance member 180. Also, a third inclined surface 184 may be disposed on an inner circumferential surface of the third hole 182. Here, the first hole 162, the second hole 174, and the third hole 184 may be different in size.

Furthermore, the first inclined surface 164, the second inclined surface 174, and the third inclined surface 184 may have the same inclined angle or have inclined angles different from one another. Also, the first and second inclined surfaces 164 and 174 or the second and third inclined surfaces 174 and 184 may have inclination directions different from each other. For example, the first and second inclined surfaces 164 and 184 may have the same inclined angle, but the first and second inclined surfaces 164 and 174 may have inclined angles and directions different from each other.

The distance maintenance members 160, 170, and 180 according to the current embodiment may be manufactured in a thin film shape such as a film. Also, the distance maintenance members 160, 170, and 180 may be independently manufactured, and then the respective distance maintenance members 160, 170, and 180 may be integrally bonded or coupled to each other.

The lens module 100 may be advantageous for mounting the distance maintenance members 160, 170, and 180, each having a complex shape, between the lenses 120 and 130. That is, since the distance maintenance members 160, 170, and 180 are separated for each section having different characteristics, the inner circumferential surfaces of the holes 162, 172, and 182 may have various shapes. Thus, according to the current embodiment, the blocking effect of the ghost and flare phenomena may be maximized through the inclined surfaces 164, 174, and 184 of the distance maintenance members 160, 170, and 180.

Hereinafter, a lens module according to a third embodiment of the present invention will be described with reference to FIGS. 8 to 9.

A lens module 100 according to the current embodiment may include a plurality of lens groups G1, G2, and G3 as shown in FIG. 8. For reference, the lens module 100 may include a first lens group G1, a second lens group G2, and a third lens group G3. In addition, the lens group 100 may include the above-described distance maintenance member 160.

The first lens group G1 may be a lens group disposed closest to a subject in the lens module 100. Also, the first lens group G1 may include at least one lens. For reference, the first lens group G1 may include a first lens 110 disposed closest to the subject. However, the first lens group G1 may include not only the first lens 110, for example, the first lens group G1 may include other lenses in addition to the first lens 110.

The first lens group G1 may be coupled to a lens barrel 190. For reference, the lens of the first lens group G1 may be in contact with the lens barrel 190 and aligned with an optical axis. That is, top and side surfaces of the first lens 110 may be in contact with an inner circumferential surface of the lens barrel 190, and then an optical axis of the first lens 110 may be aligned with the optical axis of the lens barrel 190.

The second lens group G2 may be disposed between the first lens group G1 and the third lens group G3. Also, the second lens group G2 may include at least one lens. For reference, the second lens group G2 may include a second lens 120, a third lens 130, and a fourth lens 140.

The second lens group G2 may be aligned by the first lens group G1. For reference, the lenses 120, 130, and 140 of the second lens group G2 may be coupled to the first lens 110 of the first lens group G1 and aligned with the optical axis of the first lens group G1. For this, the first and second lens groups G1 and G2 may have structures that are capable of being coupled and aligned with each other. For example, the first lens group G1 may have a conical surface, a protrusion, or a groove therein. Also, the second lens group G2 may have a shape corresponding to that of the conical surface, protrusion, or groove of the first lens group G1.

The second lens group G2 may not be in contact with the lens barrel 190. That is, the second lens group G2 may be in contact with the first lens group G1, but not be in contact with the lens barrel 190. In this case, the second lens group G2 including a plurality of lenses may be easily mounted in the lens barrel 190. Also, since the second lens group G2 is coupled to the first lens group G1 without being in contact with the lens barrel 190, the optical axis of the second lens group G2 may be always aligned with that of the first lens group G1.

The third lens group G3 may be disposed closest to an image sensor. Also, the third lens group G3 may include a plurality of lenses. For reference, the third lens group G3 may include a fifth lens 150 disposed closest to the image sensor. Also, the third lens group G3 may further include an IR filter, blocking infrared rays, as occasion demands.

The third lens group G3 may be in contact with the lens barrel 190. For reference, the third lens group G3 may be coupled to the lens barrel 190 to prevent the second lens group G2 from being separated from the lens barrel 190.

A vertical surface 156 and an inclined surface 158 may be disposed on a side surface of the fifth lens 150 constituting the third lens group G3 as shown in FIG. 9. Here, the vertical surface 156 may increase an area of friction between the fifth lens 150 and the lens barrel 190 to improve coupling force between the fifth lens 150 and the lens barrel 190. On the other hand, the inclined surface 158 may enable the fifth lens 150 to be easily press-fitted into the lens barrel 190 as well as to easily separate the fifth lens 150 from a mold for molding the lens.

For reference, although the vertical surface 156 and the inclined surface 158 are only disposed on the fifth lens 150 of the third lens group G3 in the current embodiment, the present invention is not limited thereto. For example, a vertical surface and an inclined surface may be disposed on side surfaces of the lenses constituting the first and second lens groups G1 and G2.

The distance maintenance member 160 may be disposed between the second lens group G2 and the third lens group G3. A plurality of inclined surfaces 164 and 166 may be disposed on an inner circumferential surface of the distance maintenance member 160. As described above, the distance maintenance member 160 may effectively reduce the ghost and flare phenomena due to the internal reflection of the lens.

Although the distance maintenance member 160 is disposed between the second lens group G2 and the third lens group G3 in FIG. 8, the present invention is not limited thereto. For example, the distance maintenance member 160 may be disposed between the first lens group G1 and the second lens group G2 or between the lenses constituting the second lens group G2.

The present invention may effectively reduce the ghost and flare phenomena due to the internal reflection of the lens to improve resolution of the lens module.

In addition, the contact area between the lens barrel and the lens may be minimized to reduce the deformation of the lens barrel and the lens due to the press-fitting between the lens barrel and the lens.

While the present invention has been shown and described in connection with the embodiments, it will be apparent to those skilled in the art that modifications and variations can be made without departing from the spirit and scope of the invention as defined by the appended claims.

What is claimed is:

1. A lens module, comprising:
a lens barrel;
a first lens group coupled to the lens barrel;
a second lens group coupled to the first lens group, while not being in contact with the lens barrel;
a third lens group in contact with the lens barrel and coupled to the second lens group; and
a distance maintenance member disposed between the second lens group and the third lens group and including an aperture, for adjusting an amount of light, formed in the distance maintenance member,
wherein one or more lens of the first lens group is disposed to have an upper surface and a side surface of a flange part in contact with an internal side surface of the lens barrel,
wherein the distance maintenance member comprises a first distance maintenance member disposed between the second lens group and the third lens group and including a first aperture, for adjusting the amount of light, formed in the first distance maintenance member; and a second distance maintenance member disposed between the second lens group and the third lens group and including a second aperture, for adjusting the amount of light, formed in the second distance maintenance member.

2. The lens module of claim 1, wherein the second lens group comprises a plurality of lenses.

3. The lens module of claim 1, wherein one or more lens of the third lens group has an inclined surface formed on an outer circumferential surface.

4. The lens module of claim 1, wherein an inner circumferential surface of the aperture comprises an inclined surface having a predetermined angle with respect to an optical axis.

5. The lens module of claim 4, wherein the inclined surface comprises a first inclined surface having a first inclination angle with respect to the optical axis; and a second inclined surface having a second inclination angle with respect to the optical axis.

6. The lens module of claim 5, wherein the first inclination angle and the second inclination angle are different from each other.

7. A lens module, comprising:
a lens barrel;
a first lens group coupled to the lens barrel;
a second lens group coupled to the first lens group, while not being in contact with the lens barrel;
a third lens group coupled to the second lens group; and
a first distance maintenance member disposed between the second lens group and the third lens group and including a first aperture, for adjusting the amount of light, formed in the first distance maintenance member; and a second distance
maintenance member disposed between the second lens group and the third lens group and including a second aperture, for adjusting the amount of light, formed in the second distance maintenance member,
wherein one or more lens of the third lens group has an outer circumferential inclined surface directly adjacent a vertical surface, the vertical surface in contact with the lens barrel.

8. A lens module, comprising:
a lens barrel;
a first lens group coupled to the lens barrel;
a second lens group coupled to the first lens group, while not being in contact with the lens barrel; and
a distance maintenance member disposed on the second lens group and including an aperture, for adjusting an amount of light, formed in the distance maintenance member,
wherein an inner circumferential surface of the aperture comprises a first inclined surface having a first inclination angle with respect to the optical axis spaced apart from a second inclined surface having a second inclination angle with respect to the optical axis by a portion of the inner circumferential surface.

9. The lens module of claim 8, wherein the portion of the inner circumferential surface is disposed at an angle to the first inclination angle and the second inclination angle.

10. The lens module of claim 8, further comprising a third lens group in contact with the lens barrel and coupled to the second lens group, wherein the distance maintenance member is disposed between the second lens group and the third lens group.

11. A lens module, comprising:
a lens barrel;
a first lens group coupled to the lens barrel;
a second lens group coupled to the first lens group, while not being in contact with the lens barrel;
a third lens group in contact with the lens barrel and coupled to the second lens group; and
a distance maintenance member disposed between the second lens group and the third lens group and including an aperture, for adjusting an amount of light, formed in the distance maintenance member,
wherein one or more lens of the first lens group is disposed to have an upper surface and a side surface of a flange part in contact with an internal side surface of the lens barrel,
wherein an inner circumferential surface of the aperture comprises an inclined surface having a predetermined angle with respect to an optical axis,
wherein the inclined surface comprises a first inclined surface having a first inclination angle with respect to the optical axis, and a second inclined surface having a second inclination angle with respect to the optical axis.

12. The lens module of claim 11, wherein the second lens group comprises a plurality of lenses.

13. The lens module of claim 11, wherein one or more lens of the third lens group has an inclined surface formed on an outer circumferential surface.

14. The lens module of claim 11, wherein the first inclination angle and the second inclination angle are different from each other.

\* \* \* \* \*